United States Patent Office 3,096,266
Patented July 2, 1963

---

3,096,266
PROCESS FOR THE PREPARATION OF ACYL AND ALKYL SUBSTITUTED CYCLIC ORGANIC COMPOUNDS AND PRODUCTS RESULTING THEREFROM
Karl W. Hubel and Emile Henri Braye, Brussels, Belgium, assignors to Union Carbide Corporation, a corporation of New York
No Drawing. Filed Mar. 31, 1960, Ser. No. 18,890
Claims priority, application Great Britain Apr. 7, 1959
10 Claims. (Cl. 204—158)

This invention relates to the preparation of organic compounds and to products resulting therefrom. More particularly, the invention relates to a process for the preparation of acyl and alkyl substituted cyclic compounds.

The present invention greatly facilitates the synthesis of substituted or unsubstituted organic compounds in that it provides a new and general one-step method for this purpose. The invention is predicated upon the discovery that when certain organo-metallic complexes, as hereinafter described, whose organic part contains a preformed carbon skeleton, are reacted with compounds containing at least one element or reactant capable of forming stable bonds with the skeleton, the bonding of the element to the skeleton is readily achieved. The compounds formed thereby are characterized as containing at least one of the carbon skeletons and at least one of the elements.

Although the mechanism of the reaction is not fully understood, basic considerations applying to the inventive process can be found in the following discussion. It is believed that organo-metallic complexes as for example, $Fe_2(CO)_6(RC_2R)_2$ or $Fe_2(CO)_7(RC_2R)_2$ can be represented by the structures respectively shown below, wherein the actual meaning of R has been disregarded for the sake of clarity.

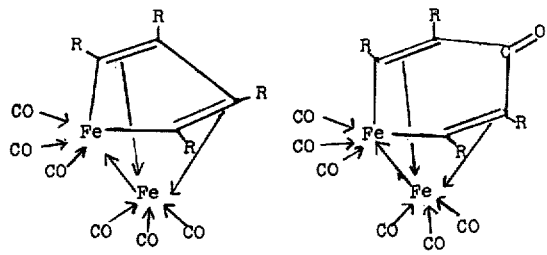

There are various evidences which indicate that the two iron atoms contained in these organo-metallic complexes have different chemical behavior. In particular it has been found that the iron atom bonded into the ring system can be more readily removed than the other iron atom. It can thus be foreseen that the splitting of the iron atoms which occurs during the reaction isolates a highly reactive carbon skeleton which can readily react with any element capable of forming stable bonding with that carbon skeleton. Similar considerations apply to the various organo-metallic complexes containing only one metal atom or one (R'C₂R'') group and apply as well to the complexes having a larger number of metal atoms or (R'C₂R'') groups in their structure. It is therefore apparent that by properly selecting the reactant containing an element capable of forming stable bondings with the carbon skeleton, a large variety of organic compounds can be provided.

According to this invention, a process for the preparation of acyl or alkyl substituted cyclic compounds comprises reacting an organo-metallic complex having the formula: $M_x(CO)_y(R'C_2R'')_z(B)_w$ with an acylation or alkylation reagent. In the above referred to organo-metallic complexes, M represents a transition metal belonging to the VI, VII or VIII sub-groups of the periodic table, CO represents a carbonyl group, R' and/or R'' may be the same or different and represent hydrogen, or hydroxyl, halogeno, carboalkoxy, alkyl, aryl, cycloaliphatic, alkoxy or silyl groups and the like, including the substituted derivatives thereof, $C_2$ represents a carbon-to-carbon bonding, B represents a member selected from the group consisting of hydrogen, mercury, halogen, alkyl, aryl or acyl, x represents an integer of from 1 to 4, y represents an integer of from 1 to 10, z represents an integer of from 1 to 6, and w represents an integer of from 0 to 4.

Typical organo-metallic complexes suitable for use in the process of this invention include:

$Fe_2(CO)_6(RC_2R')_2$, wherein R represents a phenyl or ethyl group or a hydrogen atom and wherein R' represents a phenyl, methyl, ethyl or methoxy group or a hydrogen atom.

$Fe_2(CO)_6(RC_2R')_2(B)_2$ wherein R and R'' represent hydrogen and B represents either hydrogen or a methyl rest. These complexes may be represented by the following structure:

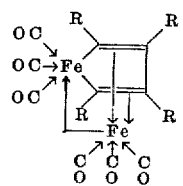

$Fe_2(CO)_7(RC_2R')_2$, wherein R and R' represent phenyl groups. This complex may be represented by the following structure:

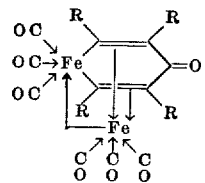

$Fe_2(CO)_6(RC_2R')$, wherein R and R' represent phenyl groups. This complex may be represented by the following structure:

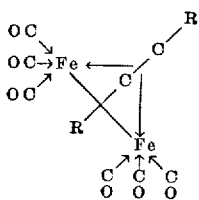

$Fe(CO)_4(RC_2R')_2$, wherein R represents a phenyl group and wherein R' represents a phenyl group or a hydrogen atom. This complex may be represented by the following structure:

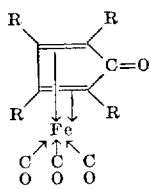

Fe(CO)$_6$(RC$_2$R'), wherein R represents a hydrogen atom or a phenyl group and wherein R' represents a hydrogen atom. This complex may be represented by the following structure:

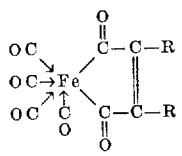

Fe$_3$(CO)$_8$(RC$_2$R')$_2$, wherein R and R' represent phenyl groups. This complex may be represented by the following structure:

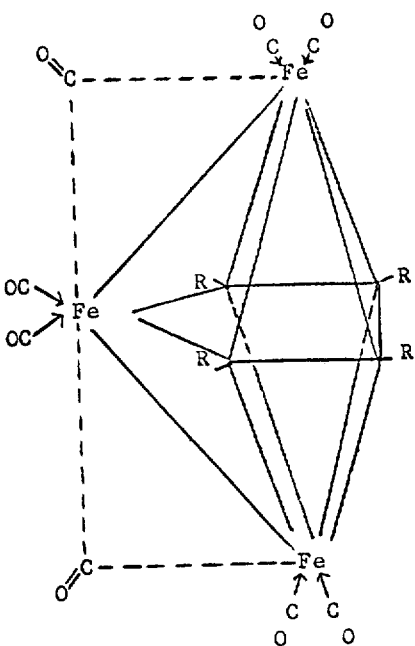

Fe$_2$(CO)$_6$(RC$_2$H)$_3$, wherein R represents a phenyl group. This complex may be represented by the following structure:

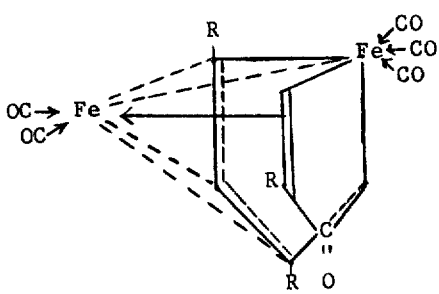

Fe(CO)$_4$(RC$_2$H)$_3$, wherein R represents a phenyl group or a hydrogen atom. This complex may be represented by the following structure:

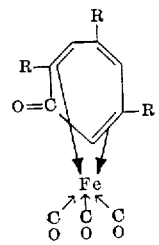

Co$_2$(CO)$_6$(RC$_2$R'), wherein R represents a phenyl group and R' represents a phenyl group or a carbomethoxy group. This complex may be represented by the following structure:

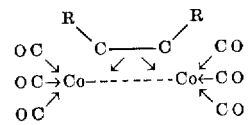

Co$_2$(CO)$_4$(RC$_2$R')$_3$, wherein R represents a carboethoxy or methyl group or a hydrogen atom and wherein R' represents a phenyl group or a trimethylsilyl group. This complex may be represented by the following structure:

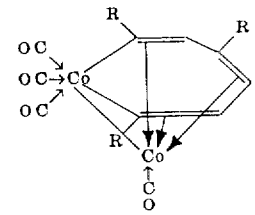

Co$_2$(CO)$_6$(RC$_2$H)$_4$Hg, wherein R represents a tertiary butyl or trimethylsilyl group. This complex may be represented by the following structure:

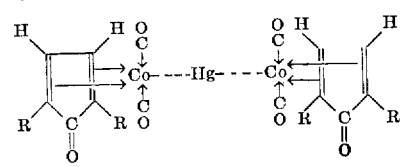

Co$_2$(CO)$_6$(RC$_2$H)$_4$, wherein R represents a tertiary butyl or trimethylsilyl group. This complex may be represented by the following structure:

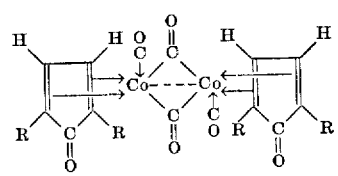

Co$_3$(CO)$_9$H(RC$_2$H), wherein R represents a phenyl group. This complex may be represented by the following structure:

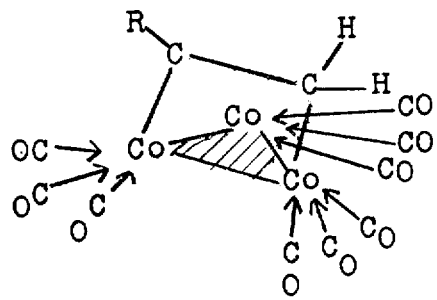

Ni(CO)$_2$(RC$_2$R')$_4$, wherein R and R' represent phenyl groups. This complex may be represented by the following structure:

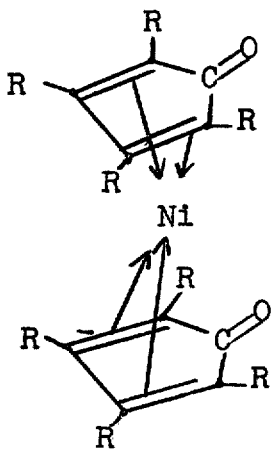

and, $$Mo_2(CO)_4(\phi C_2\phi)_5$$

Other useful organo-metallic complexes are those in which the transition metal is ruthenium, rhodium, palladium, osmium, iridium, platinum, manganese, rhenium, chromium or tungsten, or are those in which the carbonyl group bonded to the metal is partially replaced by a nitrosyl, a substituted stibine, a substituted arsine, or a substituted phosphine.

The organo-metallic complexes employed as starting materials in the present invention may be conveniently prepared by the process described in copending application 707,111, entitled, "Organo-Metallic Compounds and Method for Their Preparation," filed January 6, 1958, in the name of Karl Walter Hubel, the description thereof being incorporated herein by reference.

Briefly stated, the organo-metallic complexes can be prepared by reacting an acetylenic compound with a metal carbonyl in a non-aqueous neutral medium at a temperature of between room and 300° C. As a consequence, a stable organo-metallic carbonyl reaction product is formed. The acetylenic reactant has the formula:

$$R'C{\equiv}CR''$$

wherein R' and R'' represent a substituent selected from the group consisting of hydrogen, an organic group, and substituted derivatives thereof, a functional group and substituted derivatives thereof and an organo-substituted hydride group, the substituent being substantially inert to and inactive with the carbonyl group. The metals of the metal carbonyl group are selected from the group consisting of iron, nickel, ruthenium, rhodium, palladium, osmium, iridium, platinum, manganese, rhenium, chromium, molybdenum, cobalt and tungsten.

Exemplary of the reagents that may be employed in the process of this invention are: acyl halides, anhydrides, alkyl halides, aryl halides, and olefines with catalysts of the Lewis-type. For the purpose of this invention it is preferred to employ benzylchloride, alkyl halides, aryl-alkyl halides and olefines with the aid of catalysts such as boron trifluoride and the like.

The process of this invention can be carried out using stoichiometric amounts of the starting materials. However, it has been found that an excess of the aforesaid reactant is generally preferable. The reaction is usually carried out in a polar or non-polar organic solvent such as benzene, petroleum ether, ether, tetrahydrofuran, beta-ethoxy ethanol and the like. When side reactions are to be avoided, the selected solvent should preferably be of an inert kind. However, no addition of solvent is necessary when one of the starting materials is liquid at the reaction temperature.

The reaction is usually achieved by heating the reaction mixture, or by activating the reaction mixture with ultraviolet radiations, or by combining both heating and ultraviolet radiations. However, when employing reactants normally used at relatively low temperatures, it is advisable to cool the reaction mixture down to 0° C. or lower. Generally speaking, the reaction temperature at which the process of this invention may be carried out ranges from about −60° C. to about 250° C. The specific temperatures employed will, of course, depend upon the nature of the reactants employed. It is preferable to perform the reaction in a closed system whenever one of the reactants, or the reaction products formed thereby or the solvent employed, are too volatile at the reaction temperatures.

The reaction is usually completed within a few hours, although longer reaction times may be necessary in some instances. The reaction products are easily removable from the reaction mixture after completion of the reaction using any suitable technique. The technique of removal will of course vary according to the nature of the reaction product and the occurrence of side reactions. Suitable process conditions will be further illustrated in the specific examples hereinafter described relating to the present invention.

Typical compounds prepared by the process of this invention may be illustrated by the following general formula:

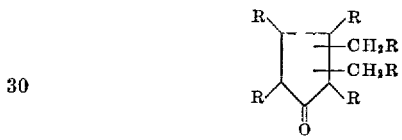

wherein R represents hydrogen or hydroxyl, halogeno, carboalkoxy, alkyl, aryl, cycloaliphatic, alkoxy or silyl groups including the substituted derivatives thereof. These cyclopentaneone or cyclopentenone compounds are by way of illustration only. Many other similar cyclic compounds may be produced by the process of this invention.

The invention may be further illustrated by the following example:

A solution of 0.96 gram $Fe_2(CO)_6(C_6H_5C_2C_6H_5)_2$ and 10 ml. benzylchloride in 30 ml. dioxane was irradiated in a quartz vessel with ultraviolet light for 5 hours at reflux temperature. The filtered reaction mixture was evaporated to dryness and the residue was chromatographed in benzene solution. The fraction eluted with a mixture of benzene/ether yielded 0.1 grams of colorless crystals having the M.P.=186–202° C. The analysis and I.R. spectrum indicated that two benzyl groups had been added on tetracyclone.

*Analysis*

|   | Found | Theoretical Calculated for $C_{43}H_{34}O$ |
|---|---|---|
| C | 91.0 | 91.13 |
| H | 6.23 | 6.06 |
| O | 2.95 | 2.82 |

The process of this invention can also be carried out employing as mentioned previously, reactants such as acetyl chloride, ethyl chloride, and the like. As also mentioned previously other solvents besides benzene can also be employed in the process of this invention. Exemplary of such solvents are toluene, normal heptane, or ethylene glycol dimethyl ether. Similarly, other organo-metallic complexes besides the iron complexes indicated in the example above can also be employed.

The compounds produced by the process of this invention have art-recognized utility or will serve as intermediates in the production of compounds having a wide range of art-recognized utility.

For example, the alkyl or acyl substituted cyclic ketonic compounds of this invention have utility as polar solvents.

They are also useful as intermediates in the synthesis of fulvenes and as starting material for the production of organo-metallic complexes and in particular, π complexes. They are also useful as intermediates for the production of compounds which have utility as plasticizers or stabilizers.

What is claimed is:

1. A process for the preparation of acyl and alkyl-substituted cyclic organic compounds free of carbon to metal bonds, which comprises reacting an organo-metallic complex having the formula:

$$M_x(CO)_y(R'C_2R'')_z(B)_w$$

wherein M is a transition metal selected from the group consisting of sub-groups VIB, VIIB and VIII of the periodic table, CO represents a carbonyl group, R' and R'' represent a member selected from the group consisting of hydrogen, halogeno, carboalkoxy, alkyl, aryl, cycloaliphatic alkoxy and silyl groups, $C_2$ represents carbon-to-carbon bonding, B represents a member selected from the group consisting of hydrogen, mercury, halogen, alkyl, aryl and acyl, $x$ represents an integer of from 1 to 4, $y$ represents an integer of from 1 to 10, $z$ represents an integer of from 1 to 6, and $w$ represents an integer of from 0 to 4, with at least a stoichiometric amount of a member selected from the group consisting of acylation and alkylation reagents, whereby the carbon to metal bond in said complex is broken and a member of the group consisting of alkyl and aryl is added to the $C_2$ group present in said complex to form the said cyclic organic compound.

2. A process as claimed in claim 1, in which the metal of the organo-metallic complex is iron.

3. A process as claimed in claim 1, in which the metal of the organo-metallic complex is cobalt.

4. The process as claimed in claim 1, in which the metal of the organo-metallic complex is nickel.

5. A process as claimed in claim 1, in which the metal of the organo-metallic complex is molybdenum.

6. A process as claimed in claim 1, in which the reagent is a member selected from the group consisting of an acyl halide, an anhydride, an alkyl halide, an aryl halide, and an olefine with a catalyst of the Lewis-type.

7. A process as claimed in claim 6, in which a stoichiometric excess of the reagent is employed.

8. A process as claimed in claim 7, in which an organic solvent selected from the group consisting of benzene, petroleum ether, ether, tetrahydrofuran and beta-ethoxy ethanol is employed.

9. A process as claimed in claim 8, in which the reaction is carried out at a temperature of between —60° C. and 250° C.

10. A process as claimed in claim 1, in which the reaction mixture is initially activated by ultraviolet radiation.

References Cited in the file of this patent

UNITED STATES PATENTS

| | | |
|---|---|---|
| 2,849,470 | Benson | Aug. 26, 1958 |
| 2,852,542 | Sweeney | Sept. 16, 1958 |
| 2,898,359 | Leedham et al. | Aug. 4, 1959 |
| 2,916,503 | Kozikowski | Dec. 8, 1959 |

UNITED STATES PATENT OFFICE
CERTIFICATE OF CORRECTION

Patent No. 3,096,266                      July 2, 1963

Karl W. Hubel et al.

It is hereby certified that error appears in the above numbered patent requiring correction and that the said Letters Patent should read as corrected below.

Column 4, lines 41 to 46, the formula should appear as shown below instead of as in the patent:

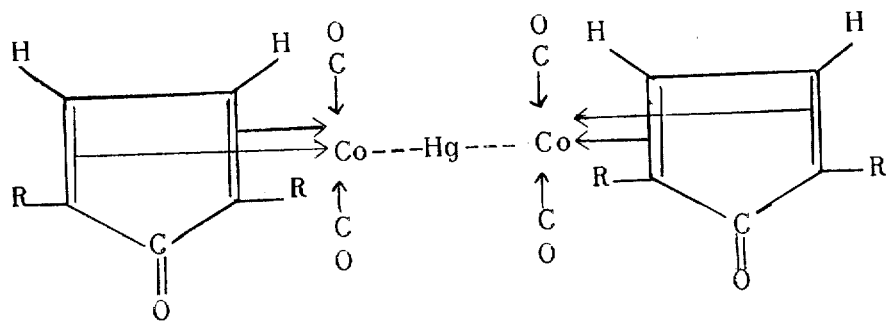

column 7, line 19, after "cycloaliphatic" insert a comma.

Signed and sealed this 12th day of May 1964.

(SEAL)
Attest:

ERNEST W. SWIDER

Attesting Officer

EDWARD J. BRENNER

Commissioner of Patent